United States Patent Office 3,378,586
Patented Apr. 16, 1968

3,378,586
PHENYL LOWER ALKYLTHIO-ALKYLAMINO
ACETANILIDE DERIVATIVES
John Krapcho, Somerset, N.J., assignor to E. R. Squibb
& Sons, Inc., New York, N.Y., a corporation of
Delaware
No Drawing. Continuation-in-part of application Ser. No.
365,812, May 7, 1964. This application June 13, 1967,
Ser. No. 645,634
7 Claims. (Cl. 260—558)

ABSTRACT OF THE DISCLOSURE

The invention relates to new chemical compounds of the general formula

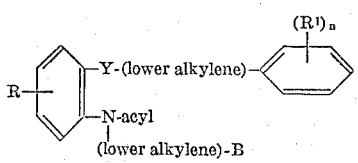

and to salts of these compounds which have serotonin inhibiting and central depressant activity and are also disinfectants.

---

This application is a continuation-in-part of application Ser. No. 365,812, filed May 7, 1964, now abandoned.

SUMMARY OF THE INVENTION

This invention relates to novel compounds of the formula (I)
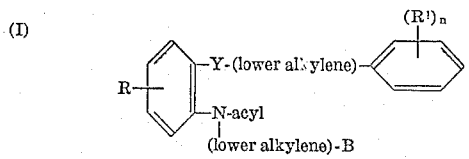

and to acid addition salts and quaternary ammonium salts thereof.

The symbols in Formula I have the following meanings:

R and $R^1$ each represent hydrogen, halo, lower alkyl, lower alkoxy, trihalomethyl, nitro, amino or hydroxy.
Y represents oxa (—O—) or thia (—S—).
B represents a basic nitrogen-containing radical of less than 12 carbon atoms.
$n$ represents 1, 2 or 3.

The lower alkyl groups represented by R and $R^1$ include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkylene groups are of the same type. The lower alkoxy groups contain alkyl groups of the same character attached to the oxygen atoms.

Each of the four halogens is contemplated by the terms "halo" and "trihalomethyl," but in the case of the halogens themselves chlorine and bromine are preferred while trifluoromethyl is the preferred trihalomethyl group.

The acyl groups include the acyl radicals of hydrocarbon carboxylic acids of less than 12 carbon atoms, for example, lower alkanoyl (e.g., acetyl, propionyl, butyryl and the like), lower alkenoyl (e.g., 2-butenoyl, 2-pentenoyl), lower alkadienoyl (e.g., sorboyl), aralkanoyl (e.g., phenyl-lower alkanoyl such as phenacetyl), aralkenoyl (e.g., phenyl-lower alkenoyl such as cinnamoyl), aralkynoyl (e.g., phenyl-lower alkynoyl such as phenyl propioloyl), aroyl (e.g., benzoyl and R-benzoyl, such as p-chlorobenzoyl, trimethoxybenzoyl and the like), lower alkane sulfonyl (e.g., methanesulfonyl) and aryl sulfonyl (e.g., benzenesulfonyl).

The preferred compounds are those wherein R and $R^1$ each is hydrogen, the acyl group is acetyl or cinnamoyl, Y is thio and B is di(lower alkyl)amino.

The basic nitrogen containing radicals symbolized by B include the following radicals (II)

wherein $R^2$ represents hydrogen, lower alkyl, hydroxy-lower alkyl, phenyl-lower alkyl and N-(lower alkyl)phenyl-(lower alkyl) forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxy-ethylamino, di(hydroxy-lower alkyl)-amino, e.g., di(hydroxyethyl)amino, phenyl(lower alkyl) amino, e.g., benzylamino, phenethylamino and the like.

In addition the nitrogen may join with the groups represented by $R^2$ to form a 5 to 7 membered monocyclic heterocyclic containing, if desired, an oxygen or an additional nitrogen atom, (no more than two hetero atoms altogether). The heterocyclic group may also be substituted by one to three of the following: lower alkyl, lower alkoxy, hydroxy-lower alkyl, lower alkanoyloxy-lower alkyl.

Thus heterocyclic groups represented by B include, for example, piperidino, (lower alkyl)piperidino, e.g., 2-methylpiperidino, (lower alkoxy)piperidino, e.g., 4-methoxypiperidino, pyrrolidino, (lower alkyl)pyrrolidino, e.g., 2-methylpyrrolidino, 3-methylpyrrolidino, di(lower alkyl)pyrrolidino, e.g., dimethylpyrrolidino, morpholino, (lower alkyl)morpholino, e.g., 3-methylmorpholino or 2-methylmorpholino, di(lower alkyl)morpholino, e.g., 2,3-dimethylmorpholino, ethoxymorpholino, piperazino, (lower alkyl)piperazino, e.g., $N^4$-methylpiperazino, 2-methylpiperazino or 3-methylpiperazino, di(lower alkyl)piperazino, e.g., 2,3-dimethylpiperazino, hydroxy-lower alkylpiperazino, e.g., 4-hydroxyethylpiperazino, (lower alkoxy)piperazino, e.g., 2-ethoxypiperazino, (lower alkanoyloxy)-lower alkylpiperazino, e.g., 4-(2-acetoxyethyl-piperazino), hexamethyleneimino and homopiperazino.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, etc., and organic salts as acetate, oxalate, tartrate, maleate, citrate, succinate, benzoate, ascorbate, salicylate, theophyllinate, camphorsulfonate, alkanesulfonate, e.g., methanesulfonate, or arylsulfonate, e.g., benzenesulfonate, toluenesulfonate and the like are also within the scope of the invention. Physiologically acceptable acids are, of course, employed where the salt form is prepared for therapeutic use, but the salts may also be used in the purification and isolation of the product.

Examples of quaternary ammonium salts of the free bases of this invention include the lower alkyl halides (e.g., methyl chloride and ethyl bromide), the lower alkyl sulfates (e.g., methosulfate), the aralkyl halides (e.g., phenyl-lower alkyl halides such as benzyl chloride) and similar aralkyl sulfates.

The compounds of the present invention are prepared by reacting a compound of the formula (III)
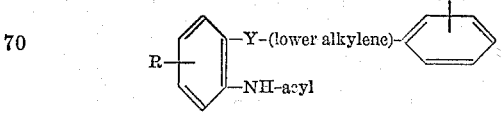

wherein R, R¹, n and Y are as hereinbefore defined, with a compound of the formula: B-(lower alkylene) halide, wherein B is as hereinbefore defined, the reaction being carried out in the presence of a strong base, such as an alkali metal amide (e.g., sodium amide), powdered alkali metal hydroxides (e.g., sodium hydroxide), and an alkali metal hydride (e.g., sodium hydride).

Compounds of Formula III can in turn be prepared by acylating a compound of the formula (IV)
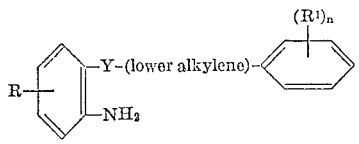

wherein R, R¹, n and Y are as hereinbefore defined, with an acyl halide or acid anhydride in the usual manner.

Compounds of Formula IV can be prepared by either reacting a nitrobenzene of the formula (V)
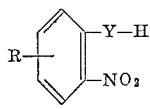

wherein R and Y are as hereinbefore defined, with a compound of the formula

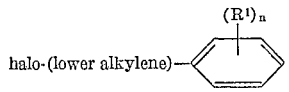

wherein R¹ and n are as hereinbefore defined, and then reducing the nitro group to an amino group in the usual manner, as by treating with stannous chloride, or, for those compounds when Y is thio, the reaction may be carried out by substituting the corresponding amino compound of Formula V for the nitro compound, in which case the reduction step can of course be omitted.

Compounds of this invention are physiologically active substances having serotonin inhibiting and central depressant activity. They may be administered orally to produce sedation in animals at a dosage of about 0.1 to 10 mg./kg. daily in single or divided doses, in the form of tablets, capsules, elixirs or the like by incorporating the appropriate dosage of the base of Formula I or a physiologically acceptable acid addition salt or quaternary ammonium salt thereof in conventional vehicle according to accepted pharmaceutical practice. They are also bacteriostats, i.e., useful as surface disinfectants at concentrations of about 0.1 to 10% (base or salt form) in aqueous solution or suspension.

The following examples illustrate the invention (all temperatures being in degrees centigrade):

Example 1.—2'-(benzylthio)-N-(2-dimethylaminoethyl) acetanilide, hydrochloride (A) *Preparation of 2-(benzylthio)aniline.*—A slurry of 54 g. of sodium methoxide in 800 ml. of isopropyl alcohol is treated with a solution of 125 g. of 2-aminobenzenethiol in 200 ml. of isopropyl alcohol, stirred at room temperature for thirty minutes. 130 g. of benzyl chloride is then added dropwise while maintaining the temperature at 20–25°. The mixture is refluxed for five hours and the solvent is removed under reduced pressure. The residue is treated with 200 ml. of cold water and the product extracted three times with 700 ml. portions of ether. The ether phases are combined, dried over magnesium sulfate and the solvent evaporated. The residue is fractionated to give about 190 g. of pale yellow oil; B.P. about 160–165° (0.5 mm.). This material is purified by crystallization from hexane; M.P. about 45–46°.

(B) *Preparation of 2' - (benzylthio)acetanilide.*—A solution of 53.0 g. of the material from part A and 100 ml. of acetic anhydride is refluxed for 10 minutes. The acetic acid and excess anhydride is removed under reduced pressure and the residue then distilled at 155–185° (0.2 mm.). Fractionation of the latter gives about 43 g. of nearly colorless distillate; B.P. 164–170° (0.2 mm.).

(C) *Preparation of 2'-(benzylthio)-N-(2-dimethylaminoethyl)-acetanilide, hydrochloride.*—A slurry of 7.8 g. of sodamide in 500 ml. of toluene is treated with a solution of 51.2 g. of material from part B in 500 ml. of toluene. The resulting mixture is stirred for one hour at room temperature and treated with a solution of 24.8 g. of 2-dimethylaminoethyl chloride in 10 ml. of toluene. The resulting mixture is refluxed for three hours, cooled and treated with 150 ml. of water. The aqueous layer is discarded and the organic phase extracted with a cold solution of 25 ml. of concentrated hydrochloric acid in 300 ml. of water. The latter phase is cooled and treated with a cold solution of 18 g. of sodium hydroxide in 50 ml. of water and the liberated base is extracted with 300 ml. of ether (three times). The ether phases are combined, treated with magnesium sulfate, filtered and the solvent evaporated to give about 52 g. of syrupy pale yellow liquid. The latter is dissolved in 1 l. of dry ether, treated with Darco, filtered and the filtrates treated with one equivalent of ethereal hydrogen chloride to give about 55 g. of solid; M.P. about 170–175°. Crystallization from 150 ml. of acetonitrile gives about 41 g. of colorless solid; M.P. about 181–183°. After recrystallization from acetonitrile, the material melts at about 182–184°.

Example 2.—2'-(benzylthio)-N-[(3-dimethylamino)propyl]acetanilide, hydrochloride Interaction of 38.4 g. of material from part B of Example 1 with 5.8 g. of sodamide and 21.0 g. of 3-dimethylaminopropyl chloride in toluene according to the procedure used in part C of Example 1 gives about 41 g. of a semi-solid hydrochloride salt. The latter is crystallized from 50 ml. of butanone to give about 34 g. of nearly colorless product; M.P. about 143–145°. Recrystallization of 28 g. of the latter from 60 ml. of isopropyl alcohol gives about 25 g. of colorless solid; M.P. 143–145°.

Example 3.—2'-(benzylthio)-N-(2-dimethylaminoethyl) propionanilide, hydrochloride (A) *Preparation of 2'-(benzylthio)propionanilide.*—A mixture of 40.0 g. of material from part A of Example 1 and 80 ml. of propionic anhydride is refluxed for ten minutes. The propionic acid and excess anhydride is removed under reduced pressure and the residue is distilled to give about 49.4 g. of pale yellow liquid; B.P. about 185–190° (0.3 mm.). Fractionation of this material gives a nearly colorless liquid; B.P. about 180–183° (0.2 mm.).

(B) *Preparation of 2'-(benzylthio) - N - (2-dimethylaminoethyl)propionanilide, hydrochloride.*—Interaction of 54.2 g. of material from part A with 7.8 g. of sodamide and 24.8 g. of 2-dimethylaminoethyl chloride in toluene according to the procedure of part C of Example 1 gives about 62 g. of nearly colorless hydrochloride, M.P. about 175–178°. After crystallization from 170 ml. of acetonitrile, the colorless product weighs about 49 g., M.P. about 179–181°.

Example 4.—2'-(benzylthio)-N-(2-dimethylaminoethyl) cinnamanilide, hydrochloride (A) *Preparation of 2'-(benzylthio)cinnamanilide.*—A solution of 43.0 g. of material from part A of Example 1, 20.0 g. of triethylamine and 200 ml. of chloroform is added dropwise to a cold solution of 33.2 g. of cinnamoyl chloride in 300 ml. of chloroform. The mixture is stirred, refluxed for 1 hour, cooled and washed with 200 ml. of water. The organic phase is dried over magnesium sulfate and the solvent evaporated under reduced pressure and the residue crystallized from acetonitrile to give 2'-(benzylthio)-cinnamanilide, M.P. about 141–143°.

(B) *Preparation of 2'(benzylthio) - N - (2-dimethylaminoethyl)cinnamanilide, hydrochloride.*—Following the procedure of Example 1, but substituting an equivalent quantity of 2'-(benzylthio)cinnamanilide for the 2'-

(benzylthio)acetanilide in part C, 2'-(benzylthio)-N-2-(dimethylaminoethyl)cinnamanilide, hydrochloride is obtained.

Example 5.—2'-(p-chlorobenzylthio)-N-(2-dimethylaminoethyl)acetanilide, hydrochloride Following the procedure of Example 1, but substituting an equivalent amount of p-chlorobenzyl chloride for the benzyl chloride in part A, 2'-(p-chlorobenzylthio)-N-(2-dimethylaminoethyl)acetanilide, hydrochloride is obtained.

Example 6.—2'-(benzylthio)-5'-trifluoromethyl-N-(2-dimethylaminoethyl)acetanilide, hydrochloride Following the procedure of Example 1, but substituting an equivalent amount of 2-amino-4-(trifluoromethyl)benzenethiol for the 2-aminobenzenethiol in part A, 2'-(benzylthio)-5'-trifluoromethyl - N - (2-dimethylaminoethyl)acetanilide, hydrochloride is obtained.

Example 7.—2'-(benzyloxy)-N-(2-dimethylaminoethyl) acetanilide, hydrochloride

Following the procedure of Example 1, but substituting an equivalent amount of o-nitrophenol for 2-aminobenzenethiol in part A, 2'-(benzyloxy)nitrobenzene is obtained. Treating this componnd with hydrogen in the presence of nickel catalyst gives 2'-(benzyloxy)aniline. By treating the latter with acetic anhydride according to part B, 2'-(benzyloxy)acetanilide is obtained. By substituting an equivalent quantity of the latter material for 2'-(benzylthio)acetanilide in part C, 2'-(benzyloxy)-N-(2-dimethylaminoethyl)acetanilide, hydrochloride is obtained.

Example 8.—2'-(benzylthio)-N-(2-dimethylaminoethyl) acetanilide

A solution of 36.5 g. of material from Example 1 in 100 ml. of water is treated with 4.0 g. of sodium hydroxide in 20 ml. of water. The liberated base is extracted with 300 ml. of ether (in three portion). The ether phases are combined, dried over magnesium sulfate and the solvent evaporated to give 2'-benzylthio-N-(2-dimethylaminoethyl)acetanilide.

Example 9.—2'-(benzylthio)-N-(2-dimethylaminoethyl) acetanilide methochloride

A solution of 15.0 g. of material from Example 8 in 100 ml. of acetonitrile is cooled and treated with 25 g. of methyl chloride. After standing for several days at room temperature, the solution is diluted to 300 ml. with ether to give 2'-(benzylthio)-N-(2-dimethylaminoethyl) acetanilide, methochloride.

Example 10.—2'-(benzylthio)-N-[3-(4-methylpiperazino)propyl]acetanilide, hydrochloride Following the procedure of Example 1 but substituting an equivalent amount of 3-(4-methylpiperazino)propyl chloride for the 2-dimethylaminoethyl chloride in part C, 2'-(benzylthio) - N - [3 - (4 - methylpiperazino)propyl] acetanilide hydrochloride is obtained.

Example 11.—2'-(phenethylthio)-N-(2-dimethylaminoethyl)acetanilide, hydrochloride By substituting an equivalent quantity of phenethyl bromide for the benzyl chloride in part A of Example 1, the desired product is obtained.

Example 12.—2'-(3,4,5-trimethoxyphenethylthio)-N-(2-dimethylaminoethyl)acetanilide, hydrochloride Following the procedure of Example 1, but substituting an equivalent amount of 3,4,5-trimethoxyphenyl bromide for the benzyl chloride in part A, the desired product is obtained.

Example 13.—2'-(p-nitrophenethylthio)-N-(2-dimethylaminoacetamide, hydrochloride Following the procedure of Example 1, but substituting an equivalent quantity of p-nitrophenethyl bromide for the benzyl chloride in part A, the desired product is obtained.

Example 14.—2'-(p-aminophenethylthio)-N-(2-dimethylaminoethyl)acetanilide, hydrochloride By treatment of the material from Example 13 with stannous chloride in a solution of acetic acid and methanol, the desired product is obtained.

Example 15.—2'-(p-hydroxyphenethylthio)-N-(2-dimethylaminoethyl)acetamide, hydrochloride By interaction of the material of Example 14 with nitrous acid and then heating, the desired product is obtained.

Example 16.—2'-[3-(2,4-dichlorophenylpropyl)thio]-N-(2-dimethylaminoethyl)acetanilide, hydrochloride Following the procedure of Example 1, but substituting an equivalent quantity of 3-(2,4-dichlorophenyl)propyl bromide for the benzyl chloride in part A, the desired product is obtained.

Example 17.—2'-(o-methylbenzylthio)-N-(2-dimethylaminoethyl)acetanilide, hydrochloride Following the procedure of Example 1, but substituting an equivalent amount of o-methylbenzoyl chloride for the benzyl chloride in part A, the desired product is obtained.

Similarly, following the procedure of Example 1, but substituting in part C for the 2-dimethylaminoethyl chloride an equivalent quantity of piperidinoethyl bromide, morpholino ethyl chloride, 3 - (4-hydroxyethylpiperazino) propyl chloride and 3 - (4 - acetoxyethylpiperazino) propyl chloride, there are obtained, respectively, (Example 18, 2'-benzylthio)-N-(2-piperidinoethyl)-acetanilide,
(Example 19) 2'-(benzylthio)-N-(2-morpholinoethyl)-acetanilide,
(Example 20) 2-(benzylthio)-N-[3-(4-hydroxyethylpiperazino)propyl]acetanilide, hydrochloride, and
(Example 21) 2'-(benzylthio)-N-[3-(acetoxyethylpiperazino)propyl]acetanilide, hydrochlride.

By substituting in Example 4, part A for the cinnamoyl chloride, an equivalent quantity of 2-butenoyl chloride, sorboyl chloride, phenacetyl chloride, phenylpropioloyl chloride, p-chlorobenzoyl chloride, methane sulfonyl chloride and benzene-sulfonyl chloride, there are obtained, respectively, (Example 22) 2'-(benzythio)-N-[2-dimethylamino)ethyl] butenoylanilide, hydrochloride,
(Example 23) 2'-(benzylthio)-N-[2-dimethylamino)-ethyl]sorboylanilide, hydrochloride,
(Example 24) 2'(benzylthio)-N-[2-(dimethylamino) ethyl]phenacetylanilide, hydrochloride,
Example 25) 2'-(benzylthio)-N-[2-dimethylamino) ethyl]phenylpropioloylanilide, hydrochloride,
(Example 26) 2'-(benzylthio)-N-[2-(dimethylamino) ethyl]-p-chlorobenzanilide, hydrochloride,
(Example 27) 2'-(benzylthio)-N-[2-(dimethylamino) ethyl]methanesulfonoanilide, hydrochloride, and
(Example 28) 2'-(benzylthio)-N-[2-(dimethylamino) ethyl]benzenesulfonoanilide, hydrochloride.

Similarly, by substituting any other B-substituted (lower alkyl) halide for the 2-dimethylaminoethyl chloride in part C of Example 1, the corresponding substituted 2' - (benzylthio)-N-[B-substituted (lower alkyl)]acetanilide, hydrochloride is obtained.

In addition, by utilizing the 2'-(benzyloxy)aniline of Example 7 as starting material, the same series of acetanilides as above, wherein Y is oxygen, is obtained.

What is claimed is:
1. A compound of the formula

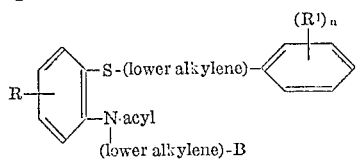

acid addition salt or quaternary ammonium salt thereof, wherein the acyl radical is lower alkanoyl, lower alkenoyl, lower alkadienoyl, phenyl-lower alkanoyl, phenyl-lower alkenoyl, phenyl-lower alkynoyl, benzoyl, R-benzoyl, lower alkanesulfonyl or benzenesulfonyl, R and $R^1$ each is hydrogen, halo, lower alkyl, lower alkoxy, trihalomethyl, hydroxy, nitro or amino, $n$ is 1, 2 or 3 and B is amino, lower alkylamino, di(lower alkyl)-amino, phenyl(lower alkyl)amino, (hydroxy-lower alkyl)amino, di(hydroxy-lower alkyl)amino, piperidino, (lower alkyl) piperidino, (lower alkoxy)piperidino, pyrrolidino, (lower alkyl)pyrrolidino, di(lower alkyl)pyrrolidino, morpholino, (lower alkyl)morpholino, di(lower alkyl)morpholino, ethoxymorpholino, piperazino, (lower alkyl)piperazino, di(lower alkyl)piperazino, hydroxy-lower alkylpiperazino, (lower alkoxy)-piperazino, (lower alkanoyloxy)-lower alkylpiperazino, hexamethyleneamino or homopiperazino.

2. A compound as in claim 1 wherein R and $R^1$ each is hydrogen, $n$ is 1, B is di(lower alkyl)amino and the acyl radical is lower alkanoyl.

3. The acid addition salt of a compound of claim 2.

4. A compound as in claim 1 wherein R and $R^1$ each is hydrogen, $n$ is 1, B is dimethylamino, the acyl radical is acetyl, the lower alkylene attached to S has one carbon and the lower alkylene attached to B has two carbons.

5. A compound as in claim 1 wherein R and $R^1$ each is hydrogen, $n$ is 1, B is dimethylamino, the acyl radical is acetyl, the lower alkylene attached to S has one carbon and the lower alkylene attached to B has three carbons.

6. A compound as in claim 1, wherein R and $R^1$ each is hydrogen, $n$ is 1, B is dimethylamino, the acyl radical is propionyl, the lower alkylene attached to S has one carbon and the lower alkylene attached to B has two carbons.

7. A compound as in claim 1 wherein R and $R^1$ each is hydrogen, $n$ is 1, B is dimethylamino, the acyl radical is cinnamoyl, the lower alkylene attached to S has one carbon and the lower alkylene attached to B has two carbons.

References Cited

FOREIGN PATENTS 855,770   12/1960   Great Britain.

OTHER REFERENCES

Shigematsu: Jour. Pharm. Soc. Japan, vol. 81, pp. 815–19 (1961).

Sieglitz et al.: Berichte, vol. 58, pp. 78–82 (1925).

JOHN D. RANDOLPH, *Primary Examiner.*

NATALIE TROUSOF, *Examiner.*